Patented Oct. 25, 1938

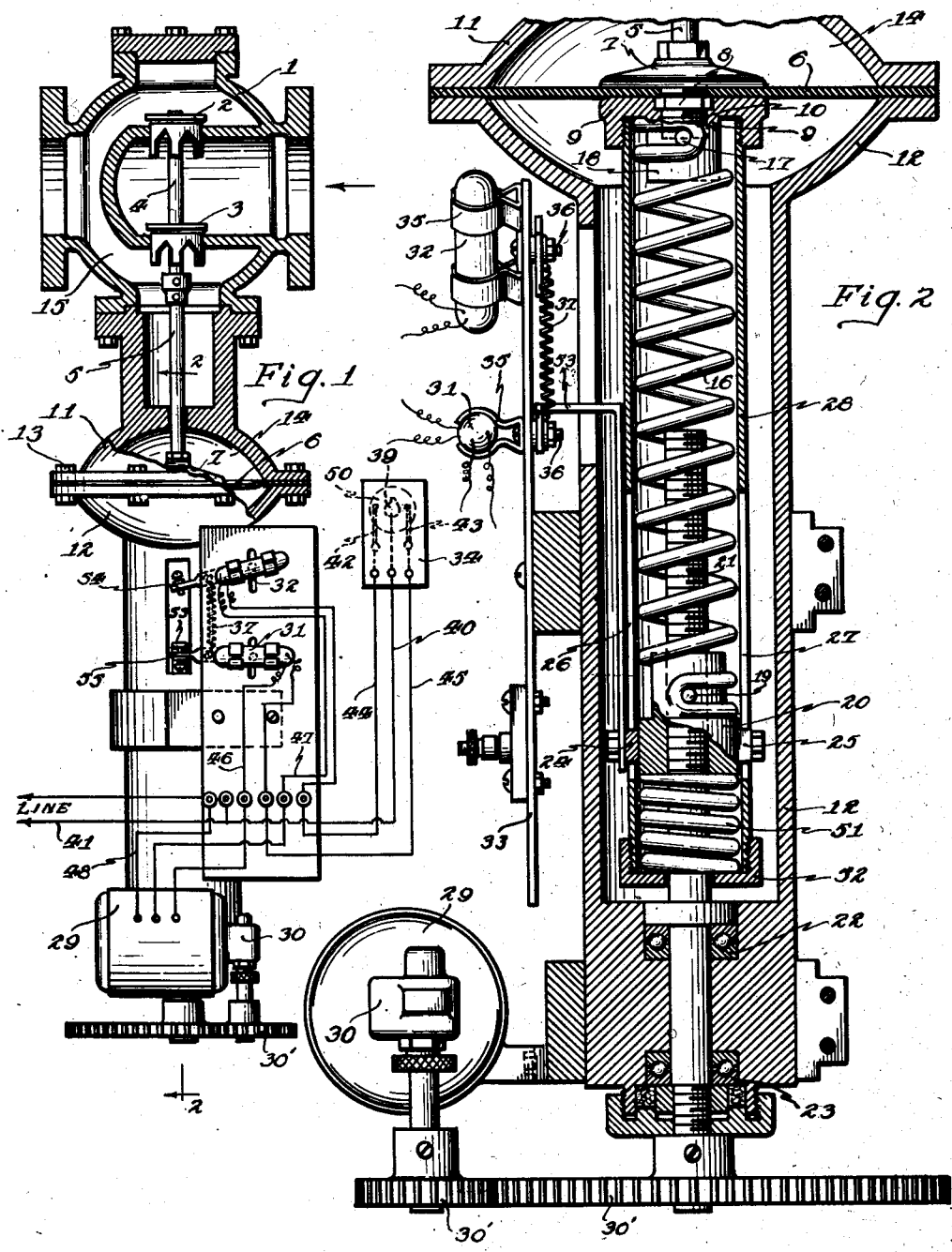

2,134,257

UNITED STATES PATENT OFFICE 2,134,257

PRESSURE REGULATOR

Richard W. Leutwiler, Chicago, and William Eichholz, Cicero, Ill., assignors to The Illinois Engineering Company, Chicago, Ill., a corporation of Illinois Application February 15, 1936, Serial No. 63,989

2 Claims. (Cl. 50—23)

This invention relates to operating means for diaphragm valves whereby such valves in addition to their ordinary responsiveness to pressure fluctuations within a predetermined range, are provided with supplementary actuating and control devices whereby the operating means is made additionally responsive to other factors, for instance temperature, as when the devices are used to control steam heating systems.

The objects of the invention are to provide improvements in pressure or flow controlling means for gaseous fluids above, at, or below atmospheric pressure to maintain a fixed or fairly uniform pressure condition of the medium or temperature produced thereby on the low pressure side irrespective of normal fluctuations in the supply pressure or rate of use. Further objects of the invention are to provide improvements in regulators of the class mentioned whereby a spring loading means may automatically pass from compression to tension as required, according to variations in conditions such as the temperature conditions in the heated zone; still further purposes of the invention are to provide such devices with positive shut-off means automatically operative upon predetermined temperature conditions in the heated zone.

The purposes of the invention are attained by means of a construction as illustrated in the drawing, wherein Figure 1 shows in elevation and partly in section the complete improved regulator with a thermostatic control therefor.

Fig. 2 is an enlarged fragmentary sectional view taken on the line 2—2 of Fig. 1.

The improvements are carried out by combining with a standard diaphragm valve pressure regulator, a spring loading means with operating mechanism for placing the spring under compression or tension depending upon a remote control device such as a thermostat. The spring compressing and tensioning means is preferably operated by an electric motor connected thereto, and switches are associated with the spring compressing and tensioning mechanism to control and be controlled by the latter, subject to separate switches at a remote thermostat. Air or other motors and control means may serve the purpose of the electrical devices illustrated.

The drawing shows a valve body 1 having a pair of balanced valves 2 and 3 carried by a stem 4 and connected by a rod 5 with a flexible diaphragm 6. The diaphragm 6 is centrally clamped to the rod 5 by the nuts 7, 8 and 9, the latter two being threaded on a post 10 depending from element 7. The diaphragm is peripherally clamped between the castings 11 and 12 by the bolts 13. The casting 11 forms an extension of the valve body 1 and is hollow to provide communication between the space 14 above the diaphragm and the space 15 on the outlet or reduced pressure side of the valve body. Thus the diaphragm is subject on one side to the pressure in the low pressure side of the valve body, and on its opposite side the diaphragm is subject to atmospheric pressure plus or minus the effect of a spring 16. This spring is secured at its upper end by means of a pin 17 to the hub portion 18 of diaphragm clamping element 9. At its lower end the spring is attached by means of a pin 19 to a collar or nut 20. The nut 20 has threaded engagement with a screw 21 having bearings 22 and 23 in the lower end of casting 12. These bearings permit the screw to rotate while preventing it from shifting in an axial direction. The nut 20 is prevented from rotating by the projections 24 and 25 carried thereby, and which extend into slots 26 and 27 in a spring housing tube 28.

An electric motor 29 is supported upon the lower end of casting 12 and is connected by enclosed worm gearing at 30 and the spur gearing 30' with screw 21.

The motor is reversible so that it may drive the screw in either direction but the extent of motion in either direction of rotation of the motor is dependent on the setting of mercury switches 31 and 32 which are pivotally mounted on a panel 33 secured to the side of casting 12. The operation and direction of rotation of the motor is dependent upon remote thermostatic switches shown in diagram on a support 34, in Fig. 1.

The mercury switches 31 and 32 are supported in clips 35 pivotally mounted on panel 33 by screws 36. The pivoted supports for the mercury switches are connected together by a spring 37 which normally holds each of the switches in its closed position. One switch is wired to the motor to drive it in one direction and the other switch is wired to the motor to drive it in the opposite direction but each of these switches is in circuit with a thermostat or other remote control device. The thermostat may be constructed as diagrammatically indicated in Fig. 1, wherein the center contact 39 is connected by conductor 40 with one side of the service line 41. There are two temperature responsive elements 42 and 43 in the thermostat which swing together to right or left under temperature changes and one or the other, when moved far enough, contacts with the element 39 and thus completes the circuit through one or the other of the switches 31 and 32 through the conductors 44 or 45. The switches are connected by conductors 46 and 47 with opposite sides of the motors. The common wire for the motors is indicated at 48.

In some uses of the construction the contact element 39, which has a contacting projection, is continuously and slowly rotated by an armature or electric motor 50 in order that when a circuit for motor 29 is effective for driving the motor in one direction or the other that instead of steadily moving the valves toward open or closed position, the movement will be intermittent or in increments over a comparatively long period. This timing may be speeded up or slowed down to offset the inherent lag in the system under control.

Whenever the nut 20 operated by the screw 21 moves down far enough to seat the valves, any slight excess operation of the motor results in compressing the cushion spring 51 between the nut and the cap 52 for tube 28. At extreme positions of the valves the motor circuit is opened by the bent bar 53 carried by nut 20. This bar is in position to engage screws 54 and 55 on the mercury tube holders 35 and 36.

When the valves are in any of their intermediate positions the spring 37 retains each mercury contact element in position to close its respective motor circuit, but when bar 53 moves up to its extreme position it opens the circuit for the motor in its valve opening direction and when it is in its extreme lower position it opens the motor circuit used for closing the valve.

In the operation of the regulator the thermostat is set for the maintenance of a desired temperature, which setting places the thermostat bars 42 and 43 in vertical position where they are clear of contact element 39. A change in temperature results in one of these elements moving over into position where it will be engaged by the rotating contact 39. Thus its respective circuit is closed through the corresponding mercury switch 31 or 32. Every time a contact is made the motor 29 is driven for a short interval. There is a large reduction between the motor and the screw 21 and the screw is only turned at each operation a slight distance.

Motion of nut 20 under the action of screw 21 upwardly permits a decrease in tension of spring 16, or an addition to its compression if the spring is under compression. While the reverse takes place when the nut moves downwardly, the effect is to add or subtract to the resultant of the opposed pressures on the diaphragm of atmosphere on the lower side and whatever pressure there is in the outlet side of the valve body 1, which pressure may be above or below atmospheric pressure.

In the above description the action of the regulator is described in connection with the control of a heating system as it would be used for controlling the entire system, a zone thereof, or a single radiator, but this is only one of the functions of the device, as it may be used for different purposes and controlled either automatically or manually from any point remote from the valve.

While a single motor has been shown for operating the adjusting nut for the spring of the reducing valve, in practice it is sometimes desirable to use two motors rather than a single motor of the reversing type.

The motors are then connected to drive in opposite directions and the reduction gearing is made variable to suit the speed with which it is desired to move the adjusting nut 20.

The operation of the motor may be controlled by either a manual switch, a thermostat or other suitable type of automatic device so arranged that when the contact is made in one position the motor will rotate in one direction, while when the switch is contacted in another position the motor will rotate in the opposite direction and when the switch is open the motor will stop.

By means of the arrangement illustrated, it is possible to adjust the operating range of the pressure reducing valve on the reduced pressure side of the valve both above and below atmospheric pressure within the range of requirement of a particular heating system.

The mercury tube switches serve the purpose of limit switches which automatically open the motor circuit whenever the spring adjusting nut reaches a position in its travel either up or down from the central position within the safe range of mechanical operation of the spring controlled by the nut. By loosening the screws 36 the limit switches may be adjusted toward and away from each other and thus determine the maximum reduced pressure and the minimum reduced pressure under which the valve will operate, and these pressure limits can be provided for anywhere within the complete range of reduced pressures for which the device is constructed. It is also desirable under certain conditions to shut the valve off completely and this may be done safely with the motor because of the cushioning spring below the spring adjusting nut. When the spring adjusting nut comes down on this cushioning spring it also acts as a stop for the cage surrounding the adjusting mechanism and thus positively prevents the valve from moving away from the seat.

We claim:

1. A regulator of the class described including a valve body and a valve, a valve operating diaphragm connected with said valve, a support and housing for said diaphragm for transmitting the pressure on the low pressure side of said valve to one face of the diaphragm, a spring attached to said diaphragm at one end, mechanism attached to the opposite end of the spring adjustable for varying the compression or tension of said spring, said mechanism including a nut to which the spring is attached, means for preventing rotation of said nut, a rotating screw having threaded engagement with the nut, a tubular housing for said spring, said housing being attached at one end to said diaphragm, a cushioning spring supported at the opposite end of said housing and bearing against said nut, and means for driving said mechanism in opposite directions.

2. An automatic pressure regulator of the class described comprising a floating diaphragm valve construction including a diaphragm arranged to have its opposite sides exposed to different pressures, a spring secured at one end to said diaphragm, a spring adjusting mechanism, said spring being secured at its opposite end to said spring adjusting mechanism, a motor for driving said adjusting mechanism in a direction to compress said spring or in a direction to tension said spring, means engageable by said spring adjusting mechanism for positively closing the valve construction, and a cushioning spring in position to be engaged by said spring adjusting mechanism at the end of its movement in one direction.

RICHARD W. LEUTWILER.
WILLIAM EICHHOLZ.